United States Patent Office 3,067,043
Patented Dec. 4, 1962

3,067,043
PRODUCTION OF DEHYDRATED FLAKE MEAT
Richard O. Marsh, Forest Park, and Justin M. Tuomy, Oak Lawn, Ill., assignors to the United States of America as represented by the Secretary of the Army
No Drawing. Filed Mar. 2, 1961, Ser. No. 93,002
10 Claims. (Cl. 99—208)
(Granted under Title 35, U.S. Code (1952), sec. 266)

The invention described herein, if patented, may be manufactured and used by or for the Government for governmental purposes without the payment to us of any royalty thereon.

This invention relates to shape-sustaining dehydrated meat products, such as flake steaks; and more particularly to raw dehydrated flake meat fabricated from carcass cuts, including less expensive cuts, which are flaked (sliced) and formed by the addition of undevitalized wheat gluten to predetermined shape and size resembling steaks or chops. These products are freeze vacuum dehydrated, and are readily rehydratable even after prolonged storage, and capable of being heat-processed upon rehydration to a meat dish having substantially the appearance, texture, and flavor of a fresh meat dish.

A dehydrated meat product in accordance with our invention will not fall apart either after dehydration or after rehydration. This principal object of our invention, which, to our knowledge, has not heretofore been achieved in the art of dehydrated flake products, is essentially accomplished by the addition to the meat flakes, prior to dehydration, of a controlled amount of undevitalized wheat gluten.

Other objects of our invention are:

To provide raw dehydrated meat items which dehydrate more rapidly than is customary with raw meat;

To provide raw dehydrated meat items which will rehydrate more rapidly than is customary with dehydrated raw meat;

To provide lower cost meat items which have many characteristics of the higher cost items and which can be dehydrated and successfully rehydrated to substantially their original state;

To provide items which receive acceptable consumer ratings;

To have these items maintain their acceptability under adverse storage conditions;

To provide meat items in which the fat content can be controlled within reasonable limits to any desired value; and To provide a dehydrated flake meat product of steak or chop shape which, upon rehydration, has the texture, quality and flavor of a fresh flake steak or chop.

To enable the utilization of hamburger grade beef cuts for the manufacture of dehydrated and subsequently rehydrated flake steaks having the acceptability of high grade steak cuts.

Other objects and advantages of our invention will readily become apparent from the following description of several operative principles and ways of carrying the same into practice.

As pointed out, the essential novel component of our product, which is added prior to dehydration of the flake meat, is undevitalized wheat gluten, a highly proteinaceous product.

Wheat gluten becomes devitalized in the presence of moisture if subjected to a temperature of about 120°–130° F. or higher. Conversely, undevitalized wheat gluten, which is contemplated for use in our invention, is wheat gluten that has not been subjected to an elevated temperature approaching 120° F. In fact, we prefer that undevitalized wheat gluten, suitable for the practice of our invention, be kept at room temperature or less. By the same token, room temperature should not be exceeded for the internal temperature of our meat product during manufacture and storage, and preferably the temperature should be below room temperature, say of the order of 40° F. or less.

The fat content of the meat component may range from about 10 to 35% by weight, with a preferred range of about 15–20%, per 100% of the meat component, prior to dehydration. If the natural fat content is insufficient it may be increased by the addition of natural fat (e.g., high-grade beef fat). The fat content of the dehydrated meat product should not exceed 50%.

We prefer to use meat flakes of a thickness of $\frac{1}{16}''$, to about $\frac{1}{64}''$, with an optimum thickness of about $\frac{1}{32}''$. The other dimensions of the flakes are not critical; they are of the type produced, e.g., by a "U.S. Slicer," and may vary from less than 1 inch to as many as 12 or more inches.

We will now proceed to describe a method of manufacturing a dehydrated flake meat product in accordance with the above-described principles of our invention, particularly in terms of a dehydrated beef flake steak. It will be understood, of course, that the above-enumerated and other objects of our invention may also be accomplished by the substitution of other types of meat in lieu of beef flakes, and by suitable variations of the detailed method steps, about to be set forth below, which are intended to be for illustrative purposes and not for the purpose of limiting the scope of our invention:

25 pounds of U.S. grade canner-cutter beef trimmings and rounds (frozen) were tempered to 25°–30° F. and then flaked on a U.S. slicer to $\frac{1}{32}''$ flakes. Additional beef fat (U.S. grade good) was flaked at $\frac{1}{64}''$ and added to the canner-cutter flakes and gently mixed to obtain uniform distribution. This fat was added to bring the product fat content to approximately 18 percent. Undevitalized wheat gluten in the amount of 3 percent per 100 percent of the mixture weight was added at the same time as the fat.

The flaked meat and gluten mixture was then placed in spring-loaded molds and chilled in a blast freezer long enough to form a hard shell. It was then removed from the molds, in the form of loaves, wrapped in paper, and frozen to —10° F. in a blast freezer.

The frozen loaves were removed from the freezer and cut into $\frac{1}{2}''$ thick slices on a band saw. They were placed on trays and immediately returned to the freezer until they were placed in the dehydrator.

Dehydration was accomplished at 0.75 to 1.5 mm. of mercury with a plate temperature of 110° F. in about 12 hours. The dehydrator vacuum was broken with nitrogen and the dried steaks packed in cans in a nitrogen atmosphere. Final moisture was in the 1–2 percent range. A typical individual dehydrated flake steak in accordance with our invention weighed 21 grams, and measured $3\frac{3}{4} \times 2\frac{1}{4} \times \frac{1}{2}''$. Obviously, these dimensions and weight are merely illustrative.

Flake steaks using pork, lamb, or veal are made the same way as the beef. Ordinarily with pork additional fat is not necessary. With beef, lamb or veal, one additional fat such as U.S. good grade beef fat may be used to bring the fat content up to 15–20 percent.

While an addition of 3% of undevitalized wheat gluten is considered to be the optimum, it can be varied, e.g., within a range of about 1–6% per 100% by weight of the undehydrated mixture. Above 4–6%, no additional beneficial effect is obtained by adding more undevitalized wheat gluten, and we therefore do not recommend to exceed 6%.

Shaping may be accomplished by extrusion in lieu of molding; e.g., on a patty forming machine, such as a "Hollymatic" steak and patty molding machine.

The final moisture content should ordinarily not exceed 2½% and is preferably of the order of about 1 to 2%.

In lieu of nitrogen packing of the dehydrated product, vacuum packing or packing in the presence of another inert gas, such as carbon dioxide, may be resorted to. Packaging in the presence of atmospheric air is not fatal, but the length of storage-stability is greater in the absence of atmospheric oxygen. Flexible sealed packages of "Mylar" (polyethylene terephthalate) or other suitable plastic material, may be used in lieu of cans.

The dehydrated metat product is prepared for consumption by removal from the package, and immersion in water until maximum moisture absorption has taken place, which is usually achieved within a period of about 3 to 10 (say 6) minutes. The rehydrated meat product is then heat-processed for consumption in accordance with conventional recipes. In the case of dehydrated flake steak, we recommend grilling for about one minute on each side on a lightly greased grill that has been preheated to about 375°–400° F.

While we do not wish to be bound by any particular theory explaining the unexpected beneficial results of our invention, we presently believe that the undevitalized wheat gluten component is particularly compatible with the flake meat component, and during rehydration becomes sticky like a glue dispersed throughout the meat flakes until final heat-processing. Devitalized wheat gluten lacks this property and therefore cannot be successfully used in the practice of our invention, as the rehydrated flake meat product would fall apart when penetrated by the rehydrating water.

It will thus be seen that we have provided a simple and entirely efficient method for dehydrating flake meat products in the presence of undevitalize wheat gluten, with excellent results and with a substantial reduction in dehydration time below the customary 22-hour period in the meat dehydration industry. The resulting product is highly palatable and can be prepared even under field conditions as long as a hot grill or similar appliance is available. We wish it to be understood that departures and changes from the various operative conditions set forth in the foregoing specification will readily occur to the expert and are therefore deemed within the scope of our invention, which we desire to claim broadly, and to that end have appended the following claims:

We claim:

1. Process of making a dehydrated flake meat product, comprising mixing at least about 1% by weight, per 100% of mixture, of undevitalized wheat gluten with raw meat flakes having a fat content of from about 10 to about 35% by weight, shaping said mixture, and freeze vacuum dehydrating said shaped mixture to a final moisture content not exceeding about 2½%; whereby a readily rehydratable storage-stable shape-sustaining dehydrated meat is obtained, which upon rehydration and heat-processing has substantially the appearance, texture and flavor of a fresh flake meat dish, said dehydrated meat containing not more than about 50% fat.

2. Process according to claim 1, wherein said dehydrated meat is packaged in the absence of atmospheric oxygen.

3. A process according to claim 1, wherein the fat content of said mixture, prior to dehydration, is about 15 to 20% by weight, per 100% of said mixture.

4. Process according to claim 1, wherein said meat is beef.

5. Process according to claim 1, wherein said undevitalized wheat gluten is added in an amount of about 3% by weight.

6. Process according to claim 1, wherein said mixture is shaped, prior to dehydration, into portions of predetermined size substantially corresponding to a meat serving.

7. Process according to claim 6, wherein each of said portions resembles a steak.

8. Process of making dehydrated flake steaks, comprising mixing from about 1% to about 6% by weight, per 100% of mixture, of undevitalized wheat gluten with raw beef flakes, adjusting the fat content of said mixture to from about 10 to about 35% by weight, shaping said mixture into steak-sized portions, and freeze vacuum dehydrating said portions to a final moisture content not exceeding about 2½%; whereby readily rehydratable storage-stable shape-sustaining dehydrated steaks are obtained, which upon rehydration and frying have substantially the appearance, texture and flavor of fresh flake steak, said dehydrated steaks containing not more than about 50% fat.

9. Process according to claim 8, wherein said undevitalized wheat gluten is added in an amount of about 3% by weight.

10. Process according to claim 8, wherein said dehydrated steaks are packaged in the absence of atmospheric oxygen.

References Cited in the file of this patent

UNITED STATES PATENTS

| | | |
|---|---|---|
| 1,729,590 | Morris | Sept. 24, 1929 |
| 2,406,395 | Noel | Aug. 27, 1946 |
| 2,765,236 | Blaine | Oct. 2, 1956 |